(12) United States Patent
Williams

(10) Patent No.: US 7,403,357 B1
(45) Date of Patent: Jul. 22, 2008

(54) DISK DRIVE FLEXURE ASSEMBLY WITH A PLURALITY OF SUPPORT BOND PAD APERTURES WITH A BOND PAD DISPOSED OVER A BOND PAD SUPPORT AND PART OF EACH SUPPORT BOND PAD APERTURE

(75) Inventor: Stephen P. Williams, Morgan Hill, CA (US)

(73) Assignee: Maxtor Corporation, Scotts Valley, CA (US)

( * ) Notice: Subject to any disclaimer, the term of this patent is extended or adjusted under 35 U.S.C. 154(b) by 437 days.

(21) Appl. No.: 11/194,874

(22) Filed: Aug. 1, 2005

Related U.S. Application Data

(60) Provisional application No. 60/599,263, filed on Aug. 5, 2004.

(51) Int. Cl.
*G11B 5/48* (2006.01)
(52) U.S. Cl. .................................................. 360/245.9
(58) Field of Classification Search ................ 360/245.9
See application file for complete search history.

(56) References Cited

U.S. PATENT DOCUMENTS

| | | | | |
|---|---|---|---|---|
| 6,459,549 | B1 | 10/2002 | Tsuchiya et al. | 360/245.9 |
| 6,944,936 | B2 * | 9/2005 | Krinke | 29/603.04 |
| 2004/0027725 | A1 | 2/2004 | Pan | 360/245.3 |
| 2004/0143959 | A1 | 7/2004 | Kamigama | 29/603.03 |
| 2005/0078415 | A1 * | 4/2005 | Tsuchiya et al. | 360/245.8 |

* cited by examiner

*Primary Examiner*—A. J. Heinz
(74) *Attorney, Agent, or Firm*—Fellers, Snider, et al.

(57) ABSTRACT

A disk drive flexure (115') includes both a support layer (116) and an electrical insulator layer (122). A flex cable (101') is disposed on the electrical insulator layer (122), and includes a plurality of slider bond pads (106'). The support layer (116) includes a bond pad support (119) for each slider bond pad (106'). Each bond pad support (119) is aligned with only a portion of its corresponding slider bond pad (106'), such that it supports less than an entirety of its corresponding slider bond pad (106').

36 Claims, 11 Drawing Sheets

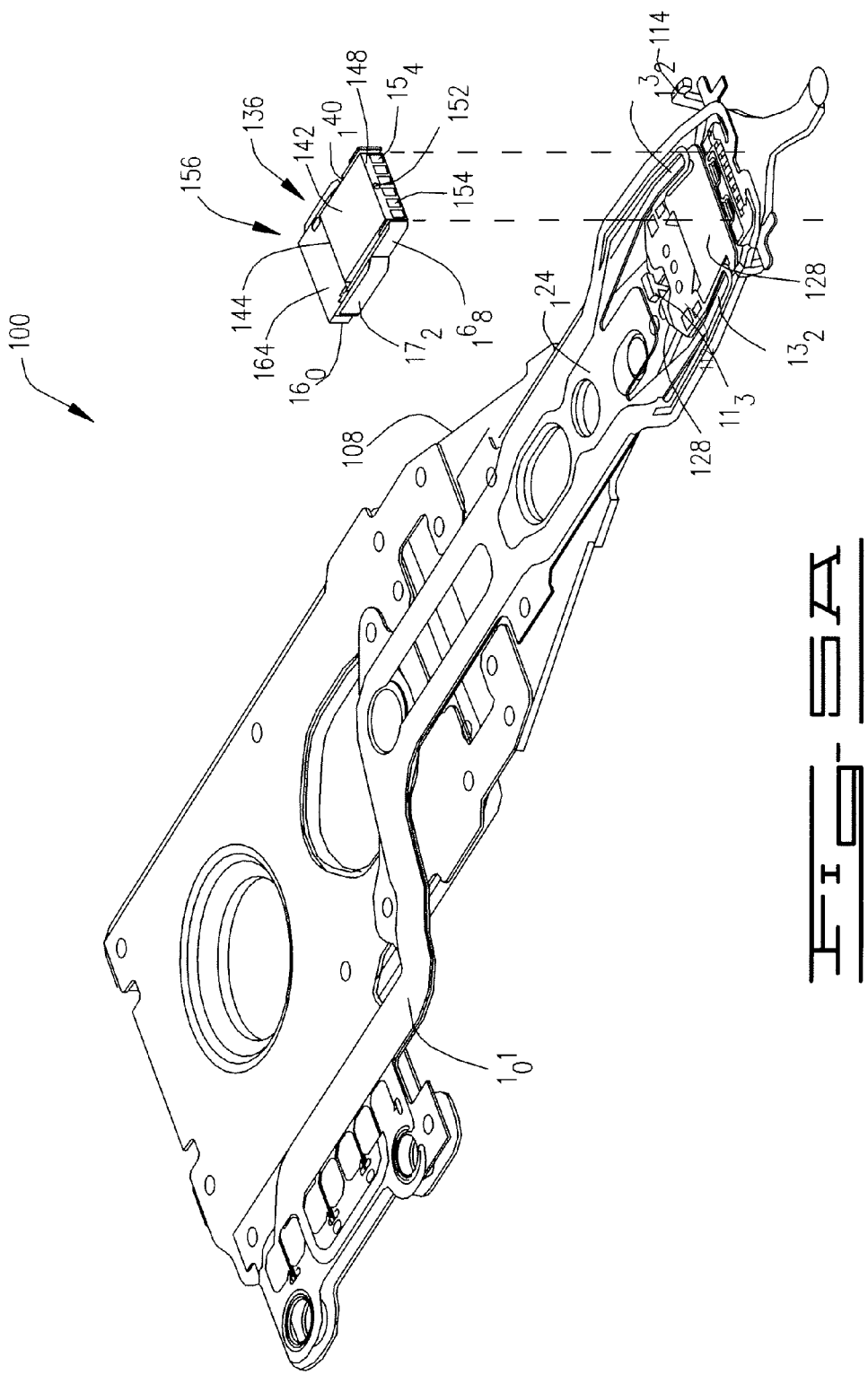

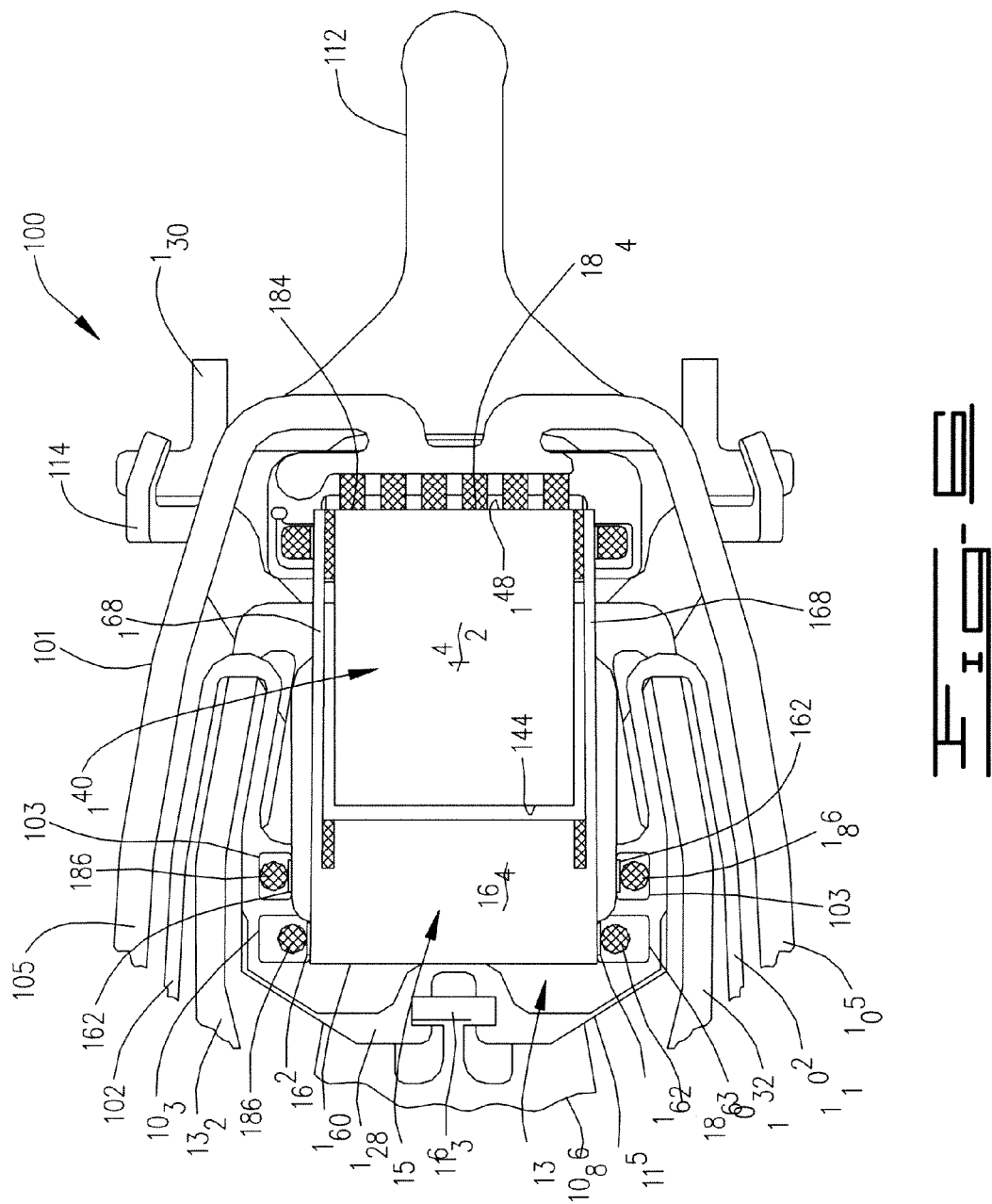

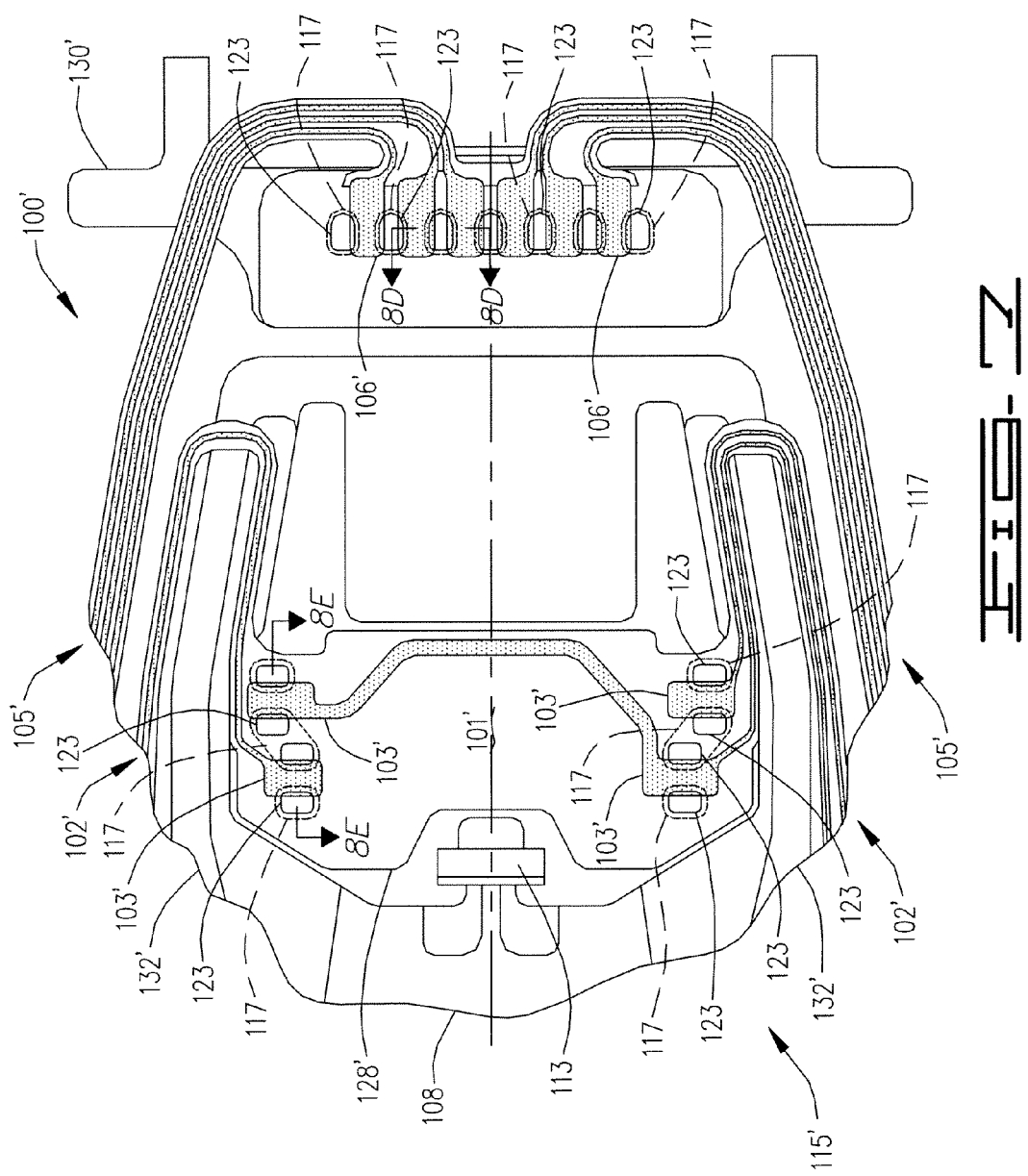

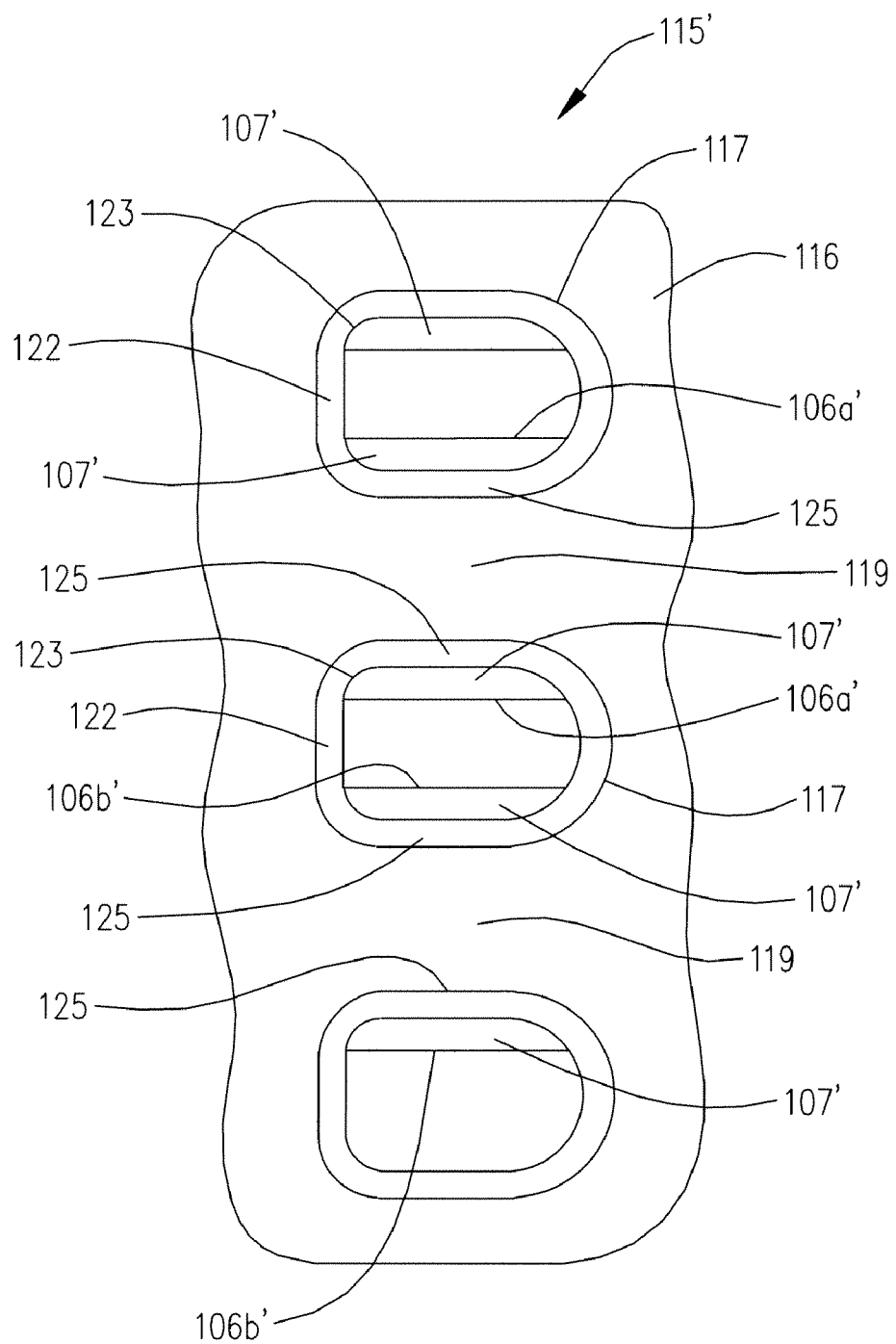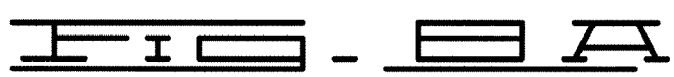

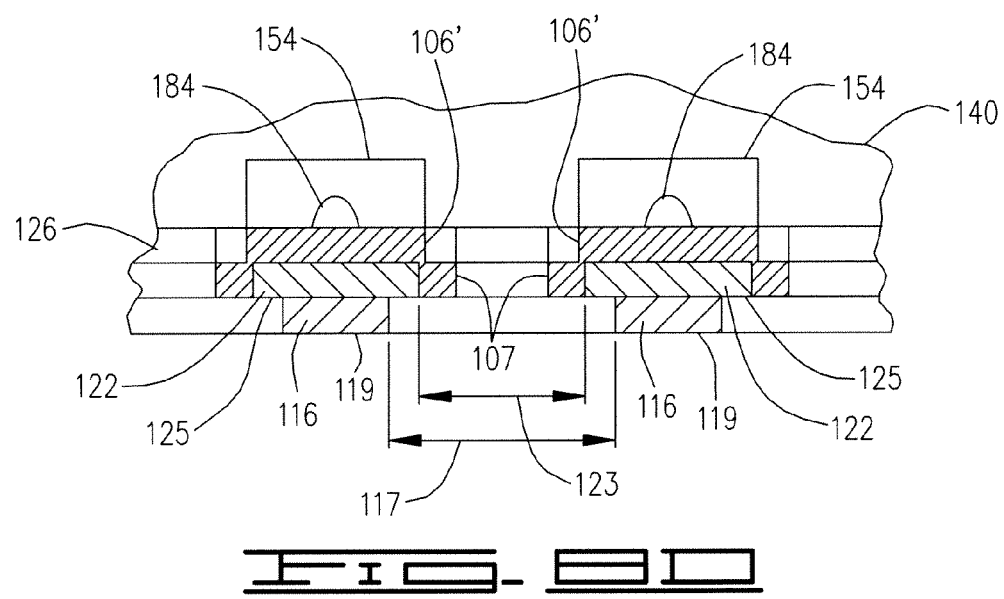
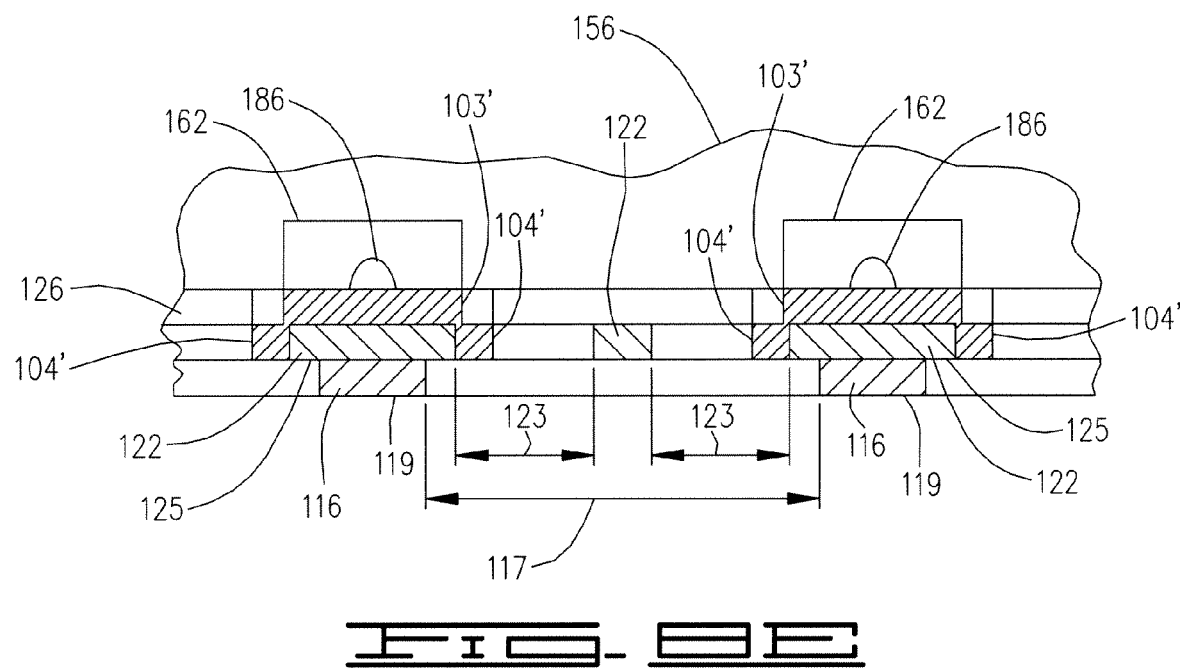

DISK DRIVE FLEXURE ASSEMBLY WITH A PLURALITY OF SUPPORT BOND PAD APERTURES WITH A BOND PAD DISPOSED OVER A BOND PAD SUPPORT AND PART OF EACH SUPPORT BOND PAD APERTURE

CROSS-REFERENCE TO RELATED APPLICATIONS

This patent application claims priority under 35 U.S.C. §119(e) to U.S. Provisional Patent Application Ser. No. 60/599,263, that was filed on Aug. 5, 2004, that is entitled "SUPPORT BOND PADS USED FOR SUSPENSION TO MICROACTUATOR AND HEAD ATTACHMENT," and the entire disclosure of which is hereby incorporated by reference in its entirety herein.

FIELD OF THE INVENTION

The present invention generally relates to the field of disk drive flexure assemblies and, more particularly, to a multi-layer disk drive flexure assembly having a backing or support layer, an intermediate insulator, and an electrical layer, where the support layer is desirably configured to partially support one or more bond pads associated with the electrical layer.

BACKGROUND OF THE INVENTION

A disk drive may include one or more head-gimbal assemblies that are appropriately mounted on what may be characterized as an actuator body (e.g., an individual actuator arm, an actuator body with one or more actuator arm tips extending therefrom). Each head-gimbal assembly generally includes a suspension, a flexure, and a slider. The suspension is mounted on the actuator body and is biased toward its corresponding data storage disk. The flexure is mounted on the suspension and desirably supports the slider relative its corresponding suspension. The slider of each head-gimbal assembly has at least one transducer (e.g., a read/write head) for exchanging information with its corresponding data storage disk. A flexure cable having a plurality of electrical traces is used to transmit signals to and receive signals from the read/write head of the slider.

The flexure and at least part of the flex cable may be integrated to define a single, multi-layer flexure assembly. One known configuration is a flexure assembly having a support layer (e.g., stainless steel), an intermediate insulator layer (e.g., polyimide), and an electrical trace layer. In the case where solder bump bonding is used to electrically interconnect the read/write head of the slider with one or more electrical traces, it is common for the bond pads associated with these electrical traces: 1) to be disposed over apertures or windows in both the support layer and insulator layer such that the bond pads are entirely un-supported; 2) to be disposed over holes or windows in the support and partially supported by only the insulator layer (not at all by the support layer), which is typically a thin, quite flexible structure; and 3) to be entirely supported by both the insulator and support layers. In the case where gold ball bonding is used to electrically interconnect the read/write head of the slider with the electrical trace assembly, it is common for the entirety of each of the bond pads to be supported by both the insulator and support layers. That is, the bond pads associated with the electrical layer are not disposed over any aperture or window formed in either of the insulator or support layers.

It would be desirable for a flexure assembly to accommodate both solder ball bonding and gold ball bonding for electrically interconnecting the read/write head of a disk drive slider, as well as any associated microactuator or slider positioner, with corresponding electrical traces.

BRIEF SUMMARY OF THE INVENTION

A first aspect of the present invention is generally directed to a disk drive flexure assembly having a support layer, an electrical insulator layer, and an electrical layer, where the electrical insulator layer is disposed between the support layer and the electrical layer. The support layer includes a plurality of support layer bond pad apertures that are appropriately spaced from each other. A first bond pad is associated with the electrical layer and is disposed over at least part of each support layer bond pad aperture of a pair of support layer bond pad apertures.

Various refinements exist of the features noted in relation to the first aspect of the present invention. Further features may also be incorporated in the first aspect of the present invention as well. These refinements and additional features may exist individually or in any combination. Typically the first bond pad will be disposed over only part of each support layer bond pad aperture of a pair of support layer bond pad apertures. As will be discussed in more detail below, the disk drive flexure assembly of the first aspect may utilize multiple first bond pads. In this case, one first bond pad may be disposed over one part of a particular support layer bond pad aperture, and another first bond pad may be disposed over a different part of this same support layer bond pad aperture.

A number of characterizations may be made in relation to the support layer associated with the first aspect. One is that the support layer may be more rigid than the electrical insulator layer. Another is that the support layer may be any appropriate metal (e.g., stainless steel). Another is that a projection of the support layer onto the first bond pad occupies less than the entire area of the first bond pad. Yet another is that the support layer includes a fixed beam (e.g., a structure fixed at its two opposite ends) that is located between and defined by a pair of support layer bond pad apertures, such that this fixed beam is aligned with only part of the first bond pad. In one embodiment, this fixed beam is aligned with a central portion of the first bond pad.

The electrical layer associated with the first aspect may include one or more electrical traces or the like, and the first bond pad may be associated with a particular electrical trace. The first bond pad may be electrically interconnected with a disk drive slider positioner connection pad of a disk drive slider positioner of a head-gimbal assembly (e.g., using a bond, such as solder ball bonding or gold ball bonding). A disk drive slider positioner is a device that is a used to change the position of a disk drive slider relative to its corresponding data storage disk, and is sometimes referred to in the art as a disk drive slider position control microactuator. The first bond pad may also be electrically interconnected with a disk drive slider connection pad of a disk drive slider (e.g., using a bond, such as solder ball bonding or gold ball bonding). Such a disk drive slider connection pad may be an electrical terminal on the slider for a write signal, for a read signal, or for a slider fly height control signal.

The disk drive flexure assembly of the first aspect may include a plurality of first bond pads, where each first bond pad is disposed over at least part of each support layer bond pad aperture of a pair of support layer bond pad apertures. Multiple first bond pads may be used to provide all electrical connections with a disk drive slider, may be used to provide all electrical connections with a disk drive slider positioner, or may be used to provide all electrical connections with both a disk drive slider and its corresponding disk drive slider positioner. In one embodiment, multiple first bond pads are also used to attach a disk drive slider to the disk drive flexure assembly without using any adhesive. In another embodiment, multiple first bond pads are also used to attach a disk drive slider positioner to the disk drive flexure assembly without using any adhesive. In yet another embodiment, multiple first bond pads are also used to attach both a disk drive slider and its corresponding disk drive slider positioner to the disk drive flexure assembly without using any adhesive.

The disk drive flexure assembly of the first aspect may be part of a head-gimbal assembly that also includes a disk drive slider assembly (e.g., a disk drive slider; a disk drive slider and a disk drive slider positioner) and solder. The disk drive slider assembly may include a disk drive slider assembly connection pad (e.g., an electrical terminal associated with a disk drive slider or a disk drive slider positioner), and the solder may be fixed to each of the first bond pad and the disk drive slider assembly connection pad. The disk drive flexure assembly of the first aspect also may be part of a head-gimbal assembly that also includes a disk drive slider assembly (e.g., a disk drive slider; a disk drive slider and a disk drive slider positioner) and gold. The disk drive slider assembly may include a disk drive slider assembly connection pad (e.g., an electrical terminal associated with a disk drive slider or a disk drive slider positioner), and the gold may be fixed to each of the first bond pad and the disk drive slider assembly connection pad.

Any appropriate material may be used for the electrical insulator layer associated with the first aspect (e.g., polyimide). In one embodiment, the electrical insulator layer includes a plurality of insulator layer bond pad apertures, where each support layer bond pad aperture is associated with its own electrical insulator layer bond pad aperture. Stated another way, there may be a one-to-one relation between the support layer bond pad apertures and electrical insulator layer bond pad apertures. In one embodiment, each support layer bond pad aperture is larger than any corresponding electrical insulator layer bond pad aperture. In another embodiment, a perimeter of each support layer bond pad aperture is disposed beyond a perimeter of any corresponding electrical insulator layer bond pad aperture. In any case, part of the support layer will still be disposed under part of the first bond pad, preferably with part of the electrical insulator layer being disposed therebetween. That is, preferably there will be a gap or open space under one part of the first bond pad, but no gap or space under a different part of the first bond pad where it is supported by the support layer and the aligned electrical insulator layer.

A second aspect of the present invention is generally directed to a disk drive flexure assembly having a support and an electrical trace assembly. The support is metal, and it includes a plurality of support bond pad apertures and a bond pad support (also metal). The bond pad support is located between and defined by an adjacent pair of support bond pad apertures. The electrical assembly includes a bond pad that is disposed over at least part of each support bond pad aperture of a pair of support bond pad apertures.

Various refinements exist of the features noted in relation to the second aspect of the present invention. Further features may also be incorporated in the second aspect of the present invention as well. These refinements and additional features may exist individually or in any combination. Typically the bond pad will be disposed over only part of each support bond pad aperture of a pair of support bond pad apertures. As will be discussed in more detail below, the disk drive flexure assembly of the second aspect may utilize multiple bond pads. In this case, one bond pad may be disposed over one part of a particular support bond pad aperture, and another bond pad may be disposed over a different part of this same support bond pad aperture.

A number of characterizations may be made in relation to the support associated with the second aspect. One is that the support may be any appropriate metal (e.g., stainless steel). Another is that a projection of the bond pad support onto the bond pad occupies less than the entire area of the bond pad. Yet another is that the bond pad support is in the form of a fixed beam (e.g., a structure fixed at its two opposite ends) that is located between and defined by a pair of support bond pad apertures, such that this fixed beam is aligned with only part of the first bond pad. In one embodiment, the bond pad support is aligned with a central portion of the bond pad.

The electrical trace assembly associated with the second aspect may include one or more electrical traces or the like, and the bond pad may be associated with a particular electrical trace. The bond pad may be electrically interconnected with a disk drive slider positioner connection pad of a disk drive slider positioner of a head-gimbal assembly (e.g., using a bond, such as solder ball bonding or gold ball bonding). A disk drive slider positioner is a device that is a used to change the position of a disk drive slider relative to its corresponding data storage disk, and is sometimes referred to in the art as a disk drive slider position control microactuator. The bond pad may also be electrically interconnected with a disk drive slider connection pad of a disk drive slider (e.g., using a bond, such as solder ball bonding or gold ball bonding). Such a disk drive slider connection pad may be an electrical terminal on the slider for a write signal, for a read signal, or for a slider fly height control signal.

The disk drive flexure assembly of the second aspect may include a plurality of bond pads, where each bond pad is disposed over at least part of each support bond pad aperture of a pair of support bond pad apertures. Multiple bond pads may be used to provide all electrical connections with a disk drive slider, may be used to provide all electrical connections with a disk drive slider positioner, or may be used to provide all electrical connections with both a disk drive slider and its corresponding disk drive slider positioner. In one embodiment, multiple bond pads are also used to attach a disk drive slider to the disk drive flexure assembly without using any adhesive. In another embodiment, multiple bond pads are also used to attach a disk drive slider positioner to the disk drive flexure assembly without using any adhesive. In yet another embodiment, multiple bond pads are also used to attach both a disk drive slider and its corresponding disk drive slider positioner to the disk drive flexure assembly without using any adhesive.

The disk drive flexure assembly of the second aspect may be part of a head-gimbal assembly that also includes a disk drive slider assembly (e.g., a disk drive slider; a disk drive slider and a disk drive slider positioner) and solder. The disk drive slider assembly may include a disk drive slider assembly connection pad (e.g., an electrical terminal associated with a disk drive slider or a disk drive slider positioner), and the solder may be fixed to each of the bond pad and the disk drive slider assembly connection pad. The disk drive flexure assembly of the second aspect also may be part of a head-gimbal assembly that also includes a disk drive slider assembly (e.g., a disk drive slider; a disk drive slider and a disk drive slider positioner) and gold. The disk drive slider assembly may include a disk drive slider assembly connection pad (e.g., an electrical terminal associated with a disk drive slider or a disk drive slider positioner), and the gold may be fixed to each of the bond pad and the disk drive slider assembly connection pad.

The disk drive flexure assembly of the second aspect may further include an electrical insulator that is disposed between the support and the electrical trace assembly. In one embodiment, the support is more rigid than the electrical insulator. Any appropriate material may be used for the electrical insulator (e.g., polyimide). This electrical insulator may include a plurality of insulator bond pad apertures, where each support bond pad aperture is associated with its own insulator bond pad aperture. Stated another way, there may be a one-to-one relation between the support bond pad apertures and insulator bond pad apertures. In one embodiment, each support bond pad aperture is larger than any corresponding insulator bond pad aperture. In another embodiment, a perimeter of each support bond pad aperture is disposed beyond a perimeter of any corresponding insulator bond pad aperture. In any case, part of the support will still be disposed under part of the bond pad, preferably with part of the insulator being disposed therebetween where it is supported by the bond pad support and the aligned portion of the electrical insulator. That is, preferably there will be a gap or open space under one part of the bond pad, but no gap or space under a different part of the bond pad.

BRIEF DESCRIPTION OF THE SEVERAL VIEWS OF THE DRAWING

FIG. 5A is a perspective view of a head-gimbal assembly that may be used by the disk drive of FIG. 1.

FIG. 6 is an enlarged view of a portion of the head-gimbal assembly of FIG. 5A.

FIG. 7 is a top view of a modified flexure that may be used by the head-gimbal assembly of FIG. 5A, along with a corresponding portion of a flex cable that has various bond pads that are desirably supported by this modified flexure.

FIG. 8A is a plan view of a bottom portion of the modified flexure of FIG. 7 and a corresponding portion of the flex cable that includes slider bond pads.

FIG. 8D is a cross-sectional view taken a long line 8D-8D in FIG. 7 when the slider assembly is mounted on the modified flexure of FIG. 7, and which illustrates how the modified flexure of supports the slider bond pads of the flex cable.

FIG. 8E is a cross-sectional view taken along line 8E-8E in FIG. 7 when the slider assembly is mounted on the modified flexure of FIG. 7, and which illustrates how the modified flexure supports the microactuator bond pads of the flex cable.

DETAILED DESCRIPTION OF THE INVENTION

Figure 1:
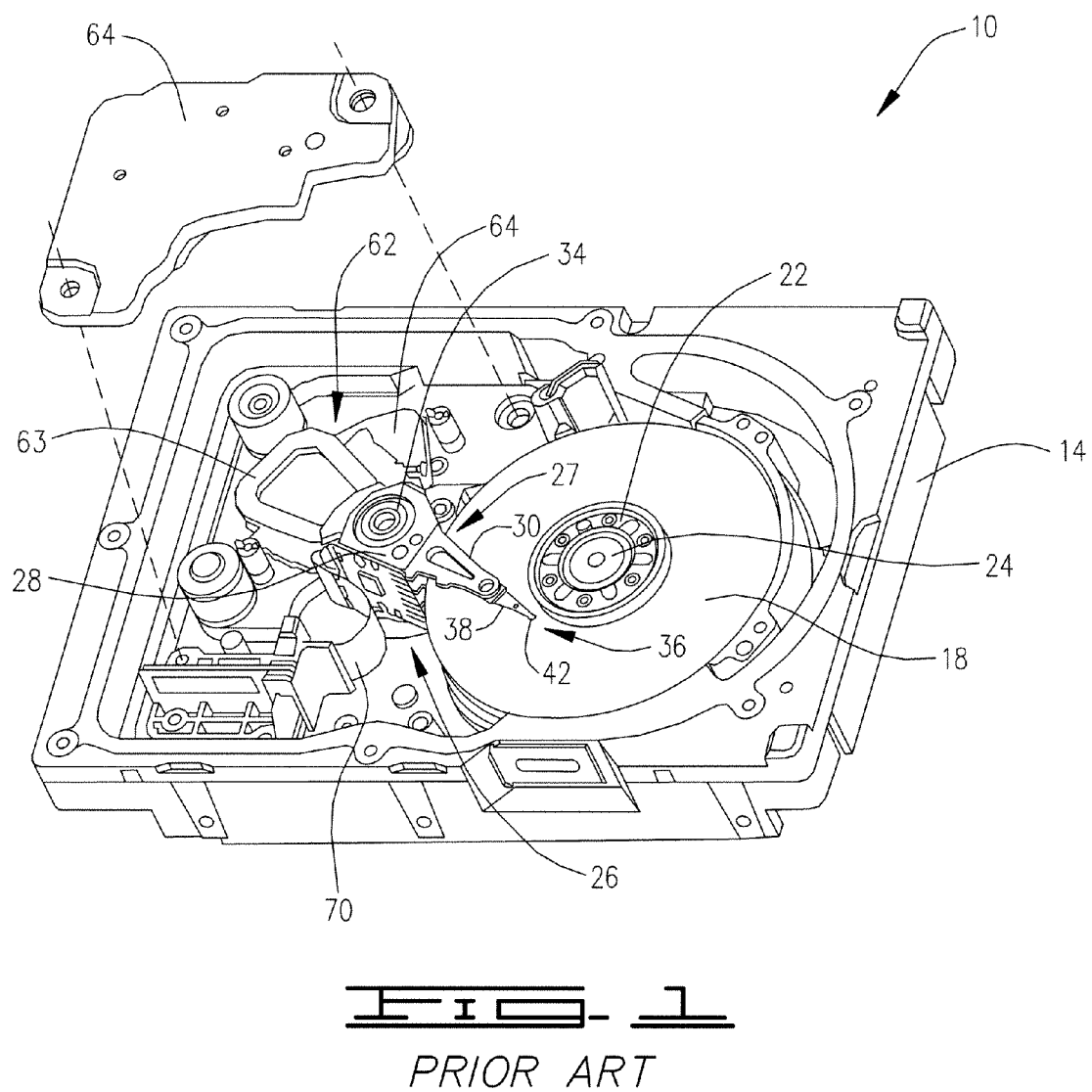
FIG. 1 is a perspective view of a prior art disk drive that may be adapted to incorporate partially supported bond pads of a flex cable to enhance the interconnection of the same with the slider and/or a slider microactuator.
Figure 2:
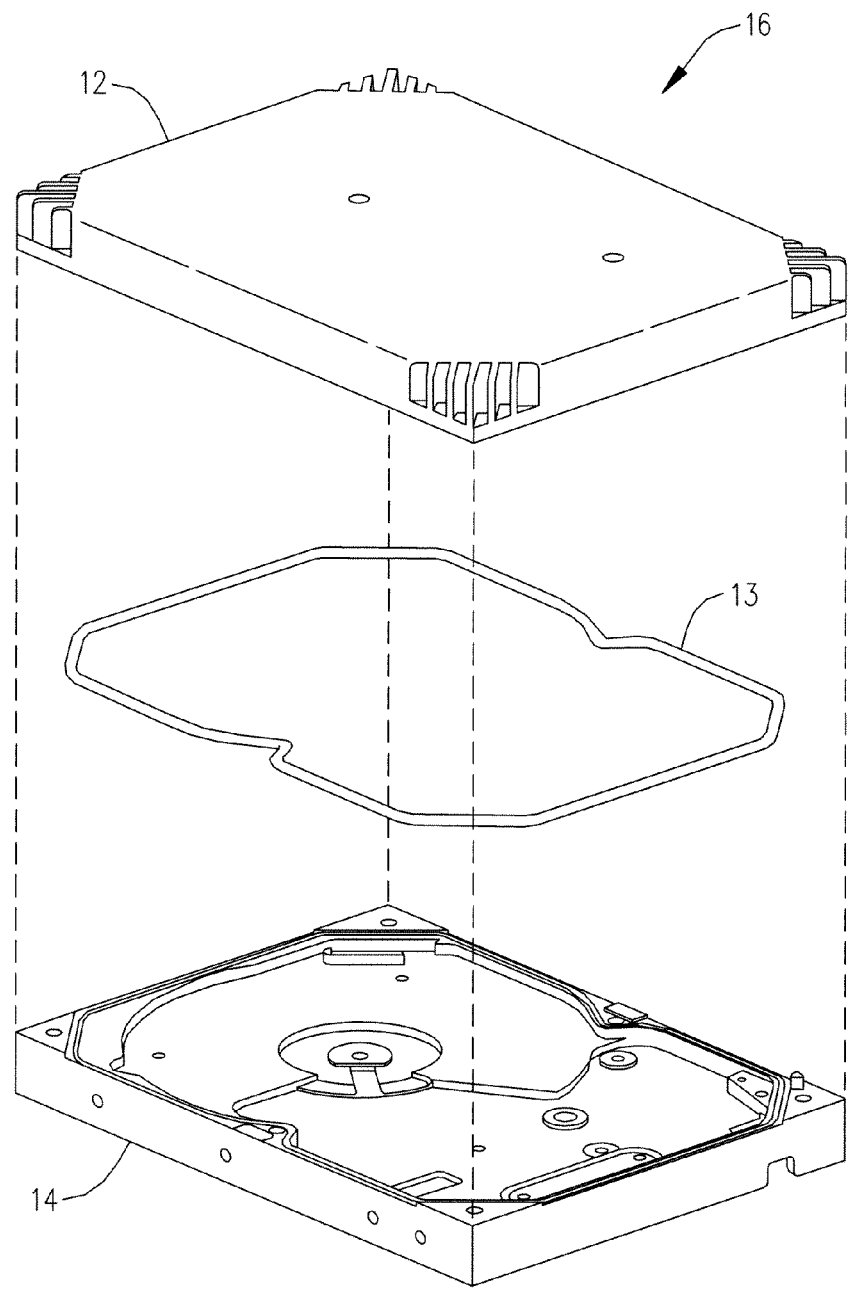
FIG. 2 is an exploded, perspective view of a prior art disk drive housing for the disk drive of FIG. 1.

One embodiment of a prior art disk drive 10 is illustrated in FIGS. 1-4. However, this disk drive 10 may be adapted to incorporate a disk drive flexure assembly with individual stainless steel bond pad supports, the combination of which is not in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM Assembly") 64 that is disposed above and below this coil 63 (the upper VCM assembly 64 being "exploded away" in FIG. 1). The VCM magnet assemblies 64 will typically be mounted on the housing 16 in a fixed position, with the upper VCM assembly 64 being appropriately supported above the lower VCM assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
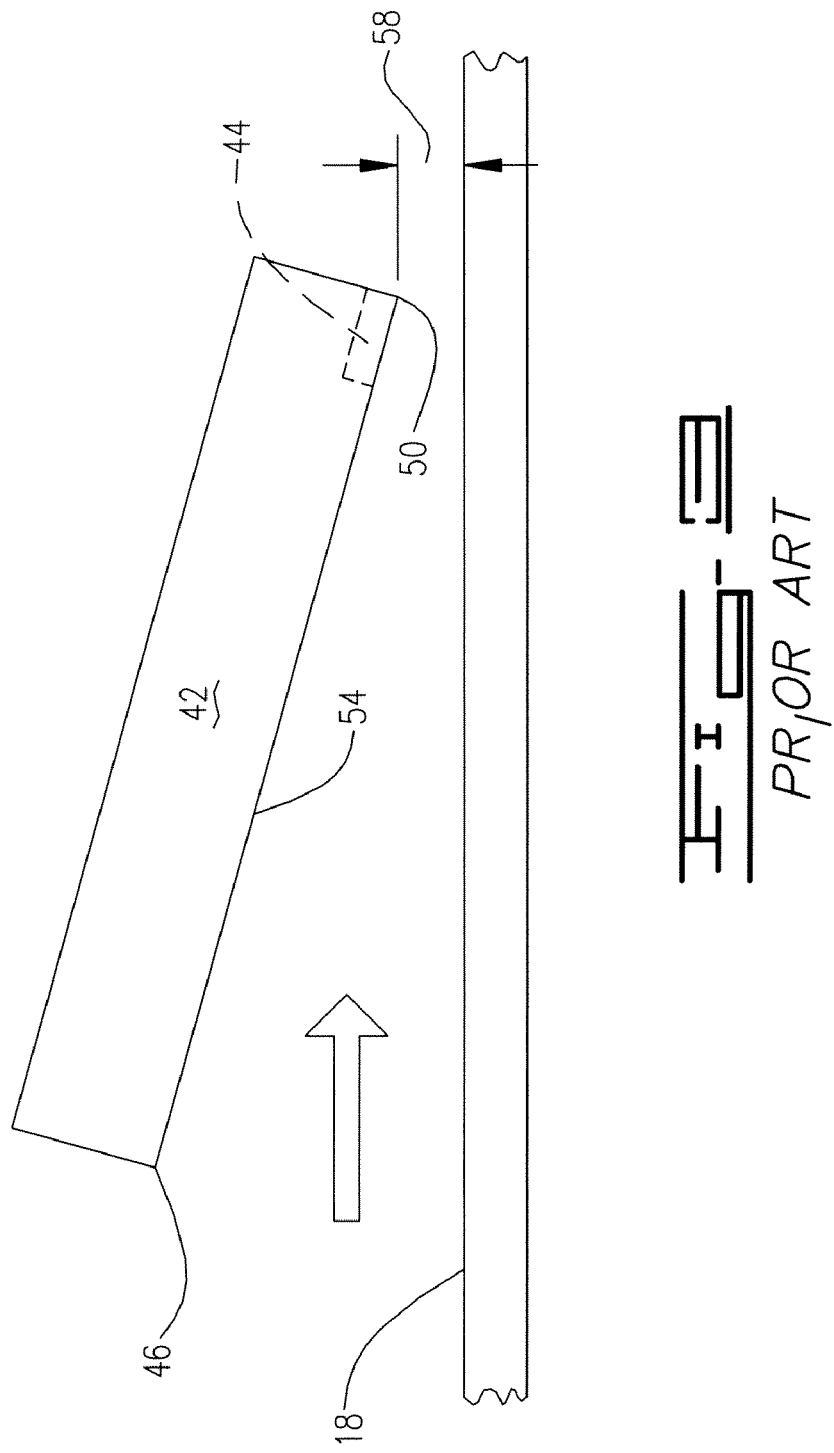
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
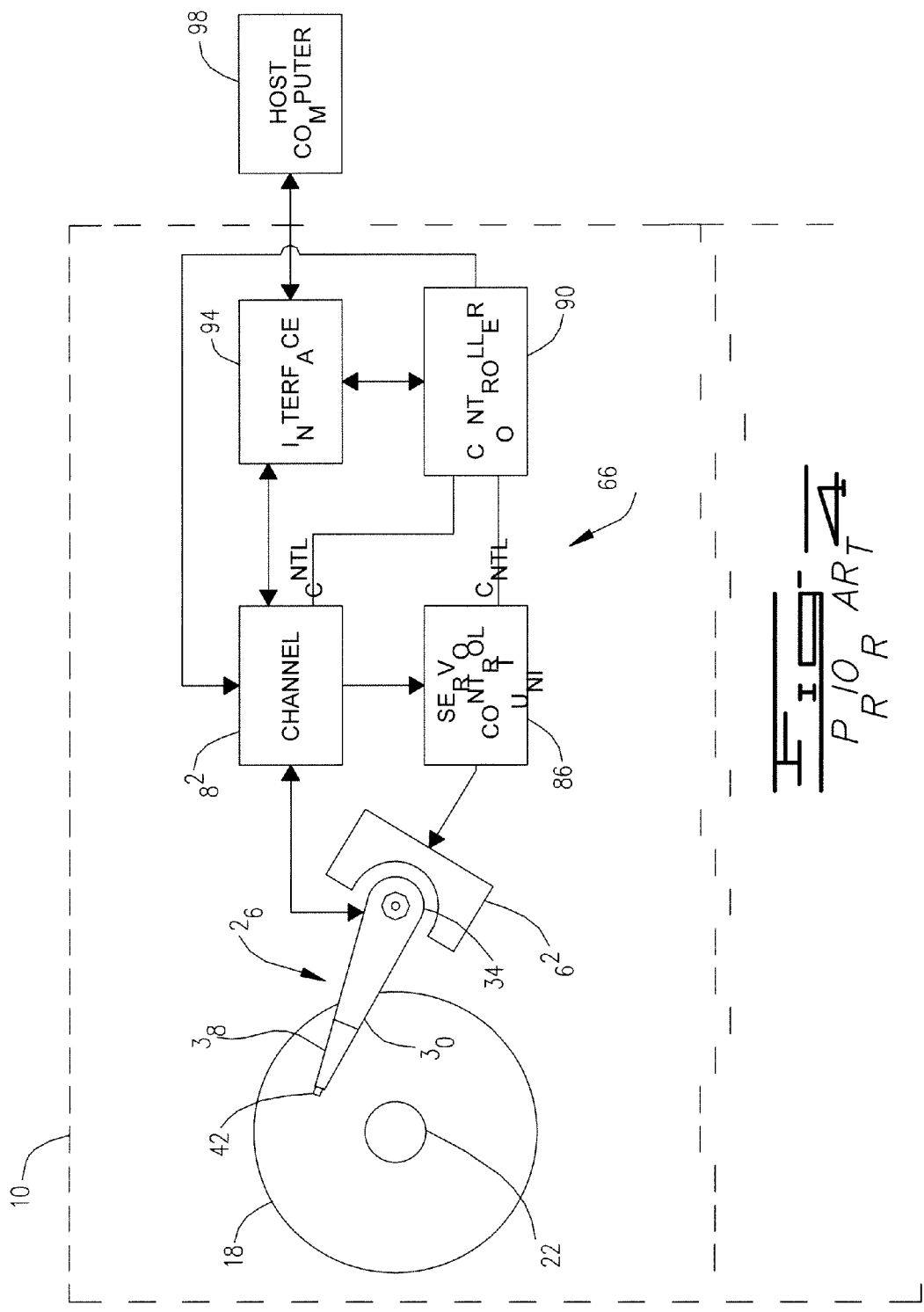
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5B:
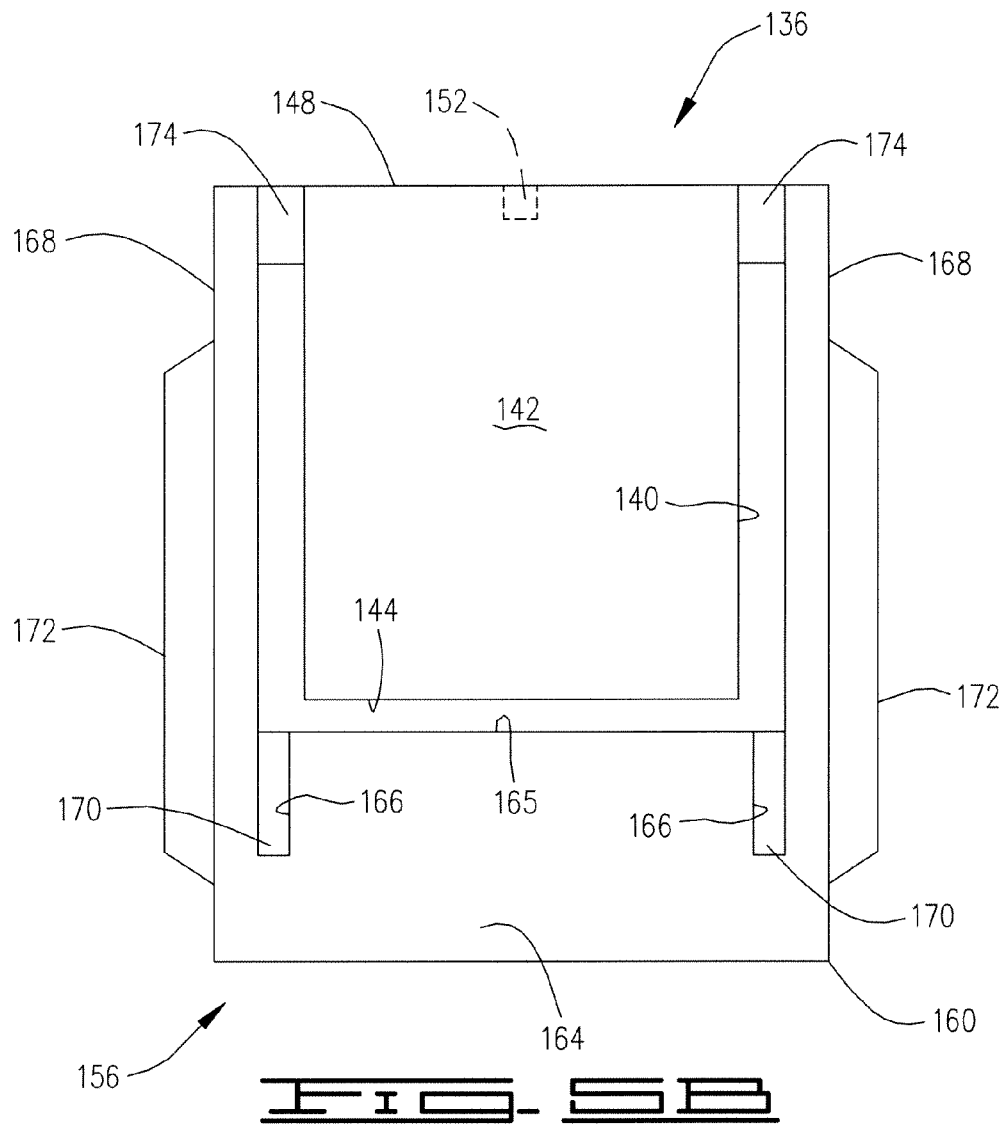
FIG. 5B is a bottom view of a disk drive slider positioner or slider position control microactuator used by the head-gimbal assembly of FIG. 5A.
Figure 5C:
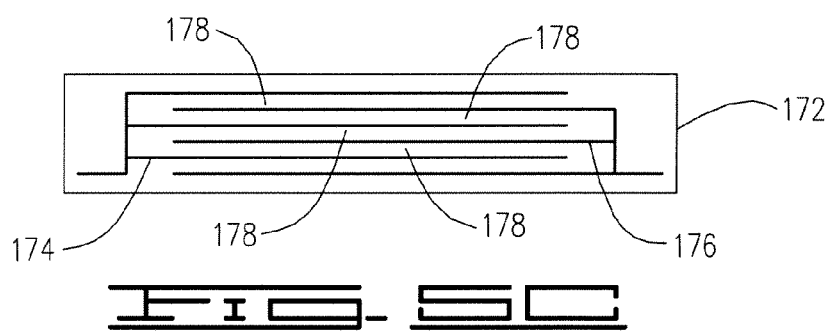
FIG. 5C is a schematic of one of the piezoelectric elements used by the disk drive slider positioner of FIGS. 5A-B.

One embodiment of a head-gimbal assembly that may be used in place of the head-gimbal assembly 36 in the disk drive 10 is illustrated in FIGS. 5A-C and is identified by reference numeral 100. The head-gimbal assembly 100 generally includes suspension 108, an electrical trace assembly or a flex cable 101, a flexure 115, and what may be characterized as a slider assembly 136. The suspension 108, flex cable 101, and flexure 115 may be of any appropriate size, shape, and/or configuration. Generally, the suspension 108 biases the slider assembly 136 toward its corresponding data storage disk; the flexure 115 provides a desired interconnection between the slider assembly 136 and the suspension 108; the flex cable 101 provides electrical signals to and receives electrical signals from the slider assembly 136; and the slider assembly 136 communicates with its corresponding data storage disk.

The flexure 115 is appropriately mounted on the suspension 108 at one or more locations, and includes a pair of deflectable gimbal legs 132 to movably support the slider assembly 136 relative to the suspension 108. In this regard, the flexure 115 further includes a flexure tongue 128 that is supported by the gimbal legs 132. A hinge (not shown) also allows the flexure tongue 128 to pivot/move along at least somewhat of a predefined axis relative to the gimbal legs 132. Typically, the hinge axis will be at least generally perpendicular to the long axis of the suspension 108. A dimple or other protrusion (not shown) is included on the suspension 108 and engages the side of the flexure tongue 128 that is opposite the side on which the slider assembly 136 is mounted.

The suspension 108 includes both a leading edge limiter 113 and a trailing edge limiter 114 to establish a maximum displacement of the leading and trailing edges, respectively, of the flexure tongue 128 relative to the suspension 108. The suspension 108 also includes a lift tab 112 for use in parking the head-gimbal assembly 100. Engagement of this lift tab 112 with an appropriate load/unload ramp exerts a force on the suspension 108 to increase the vertical spacing between the slider assembly 136 and its corresponding data storage disk. The leading edge limiter 113 and/or trailing edge limiter 114 of the suspension 108 may engage the flexure 115 at this time, as a suction force may still be "pulling" the slider 140 toward its corresponding data storage disk during the parking operation.

The slider assembly 136 is mounted on the flexure tongue 128 such that the trailing edge of the slider assembly 136 is disposed at or close to the hinge of the flexure tongue 128. An enlarged view of the slider assembly 136 is presented in FIG. 5B. There are two main components of the slider assembly 136—a slider 140 and what may be characterized as a slider position control microactuator or slider positioner 156. The slider 140 may be of any appropriate size, shape, and/or configuration. Generally, the slider 140 includes an air bearing surface 142 (the surface of the slider 140 that projects toward its corresponding data storage disk during disk drive operations, and that is contoured to exert forces on the slider 140 to allow it to "fly" above its corresponding data storage disk during disk drive operations, typically in closely spaced relation), a leading edge 144, a trailing edge 148, and a read/write head 152. The fluid (e.g., air) flows relative to the slider 140 from its leading edge 144 to its trailing edge 148 during disk drive operations. The illustrated slider 140 is of the "flying type," and its leading edge 144 will be spaced further from its corresponding data storage disk than its trailing edge 148 during disk drive operations. The leading edge 144 of the slider 140 is allowed to move further away from its corresponding data storage disk than the trailing edge 148 of the slider 140 by a pivoting of the flexure tongue 128 at least generally about an axis.

The slider positioner 156 is used to position the slider 140 (more specifically its read/write head 152) relative to a certain track of the corresponding data storage disk. The slider positioner 156 is generally in the form of a frame 160 and a pair of actuators 172. The frame 160 is appropriately mounted on the flexure tongue 128, and includes a base 164, as well as a pair of arms 168 that are spaced along the base 164, that each cantilever from the base 164, and that are able to move relative to the flexure tongue 128. A pair of slots 166 is formed in the base 164 at the corner between each arm 168 and the base 164. These slots 166 extend completely through the frame 160, and are of a uniform width along their entire length. A first material 170 (e.g., an epoxy or adhesive) is disposed within each of the slots 166 in order to reduce the potential for cracking of the frame 160 at the junction between the arms 168 and the base 164, and also to structurally reinforce the frame 160.

The slider 140 is positioned within the space collectively defined by the pair of arms 168 and the distal end 165 of the base 164. Typically, there will be a space between the slider 140 and each of the arms 168, as well as a space between the leading edge 144 of the slider 140 and the distal end 165 of the base 164. A first material 182 (e.g., an epoxy or adhesive) is used to fix a portion of the slider 140 to each of the arms 168. This first material 182 is typically disposed toward the free ends of the arms 168.

An actuator 172 is provided for each of the arms 168 of the frame 160, and each is in the form of what may be characterized as a piezoelectric element (e.g., a plurality of piezoelectric layers 178, along with appropriate electrode layers (signal electrode layers 176 and ground electrode layers 174, as illustrated in FIG. 5C)). The actuators 172 may be operated to exert a force on their corresponding arm 168 to deflect the same relative to the base 164 of the frame 160. This of course changes the position of the slider 140 relative to the base 164 and flexure tongue 128, and more pertinently changes the position of its read/write head 152 relative to its corresponding data storage disk.

FIG. 6 is an enlarged view of the slider assembly 136 and other adjacent portions of the head-gimbal assembly 100. As previously noted, the flex cable 101 provides signals to and receives signals from the slider assembly 136. In this regard, the flex cable 101 includes a pair of microactuator trace sections 102 (each including one or more individual electrical traces (not shown in FIG. 6)) and corresponding microactuator bond pads 103 for communicating with the microactuator 156 of the slider assembly 136. A microactuator bond 186 (e.g., via solder ball bonding; gold ball bonding) electrically interconnects each microactuator bond pad 103 with a corresponding microactuator electrical terminal or connection pad 162 on the microactuator 156. The microactuator bond 186 should be a suitably electrically conductive material (e.g., gold), as it is part of the communication path to/from the microactuator 156. An appropriate electrical signal may be provided to the microactuator 156 via an electrical path that includes one or more electrical traces of a microactuator trace section 102, a corresponding microactuator bond pad 103, a corresponding microactuator bond 186, and a corresponding microactuator connection pad 162.

Continuing to refer to FIG. 6, the flex cable 101 further includes a pair of slider trace sections 105 (each including one or more individual electrical traces (not shown in FIG. 6)) and corresponding slider bond pads (not shown in FIG. 6) for communicating with the slider 140, more specifically its read/ write head 152. One or more electrical traces could also be incorporated into the slider trace sections 105 for providing a fly height control signal or any other relevant functionality that may be incorporated by the slider 140. In any case, a slider bond 184 (e.g., via solder ball bonding; gold ball bonding) electrically interconnects each slider bond pad of the flex cable 101 with a corresponding slider electrical terminal or connection pad 154 (e.g., FIG. 5A) on the slider 140. Each slider ball 184 should be a suitably electrically conductive material (e.g., solder), as it is part of the communication path to/from the slider 140. An appropriate electrical signal may be provided to or transmitted from the slider 140 via one or more electrical traces of a slider trace section 105, a corresponding slider bond pad of the flex cable 101, a corresponding slider bond 184, and a corresponding slider connection pad 154.

FIG. 6 also illustrates certain details regarding the flexure 115. Instead of the slider assembly 136 being mounted solely on the flexure tongue 128 of the flexure 115, the slider assembly 136 is also mounted on what may be characterized as a bond pad platform 130 of the flexure 115 that is spaced from the flexure tongue 128. Generally, the slider bond pads of the flex cable 101 that electrically communicate with the slider 140 are associated with the bond pad platform 130. Stated another way, a trailing portion of the slider 140 is associated with the bond pad platform 130, while a leading portion of the slider 140 is associated with the flexure tongue 128. Therefore, the only "interconnection" between the bond pad platform 130 and the flexure tongue 128 would be that one part of the slider assembly 136 is mounted on the flexure tongue 128 and a different part of the slider assembly 136 is mounted on the bond pad platform 130.

The head-gimbal assembly 100 may be modified to incorporate a number of desirable features, based upon using a multi-layer construction for the flexure 115 and by at least in effect incorporating the flex cable 101 as a part thereof. It may be appropriate to refer to such a modified head-gimbal assembly 100 as an integrated electrical lead suspension. In any case, the flexure 115 of the head-gimbal assembly 100 may be modified such that the various bond pads used by the flex cable 101 are supported in a desired manner when using the same to interconnect with the slider assembly 136. The flexure 115 may also be modified to allow the slider assembly 136 to be fixedly mounted to the flexure 115 without using any adhesive (although adhesive will typically continue to be used to mount the slider 140 to the microactuator 156). A modified flexure that provides each of these functions will be discussed in relation to FIGS. 7-8E. Corresponding components between the flexure embodiment of FIGS. 7-8E and the flexure embodiment of FIGS. 5A-6 are identified with the same reference numeral, along with a "single prime" designation in the embodiment of FIGS. 7-8.

Figure 8B:
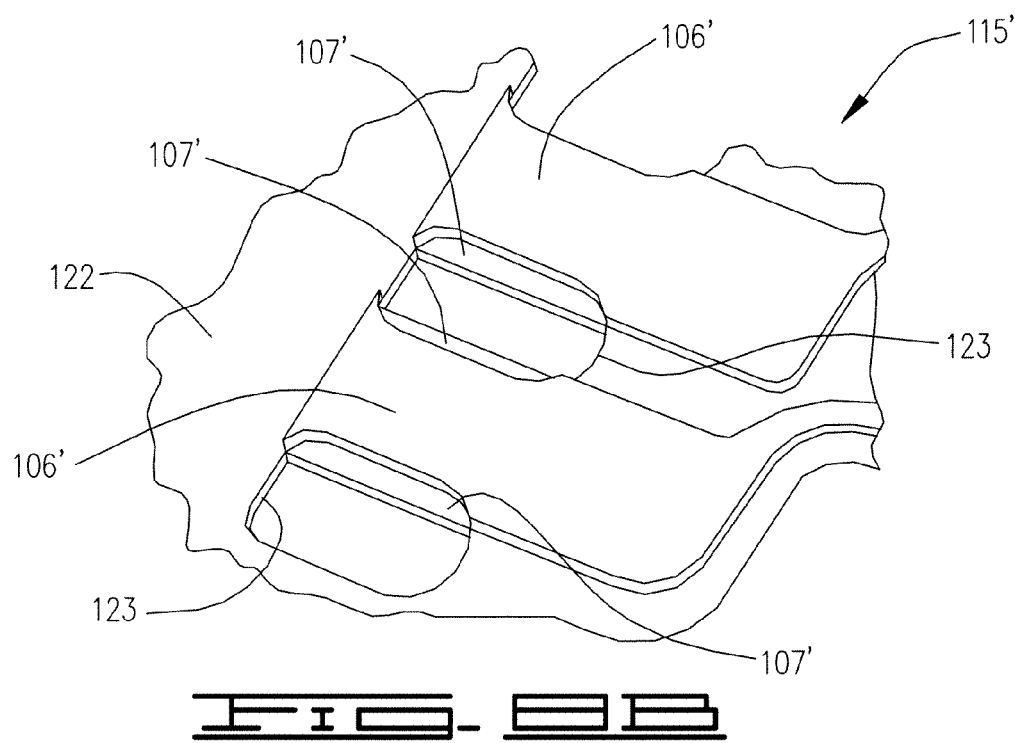
FIG. 8B is a perspective view of a top portion of the modified flexure of FIG. 7 and a corresponding portion of the flex cable that includes slider bond pads.
Figure 8C:
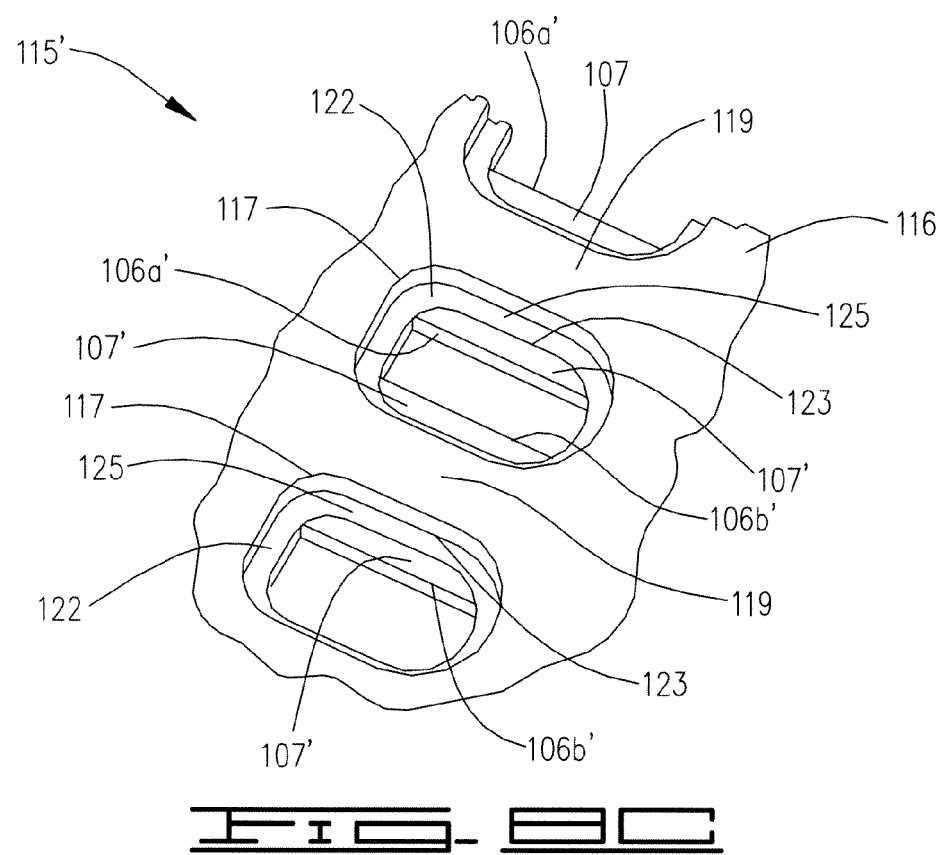
FIG. 8C is a perspective view of a bottom portion of the modified flexure of FIG. 7 and a corresponding portion of the flex cable that includes slider bond pads.

Both the microactuator bond pads 103' and the slider bond pads 106' of the flex cable 101' are desirably supported by the flexure 115' in the case of the embodiment of FIGS. 7-8E. Each microactuator bond pad 103' is electrically interconnected with a microactuator trace 102', while each slider bond pad 106' is electrically interconnected with a slider trace 105'. The flexure 115' and relevant portions of the flex cable 101' may be characterized as a flexure assembly, or relevant portions of the flex cable 101' could also be characterized as being part of the flexure 115' itself (e.g., an electrical layer 101' of the flexure 115'). In any case, the flexure 115' includes a support or support layer 116 and an electrical insulator or electrical insulator layer 122 (FIGS. 8A-E). The electrical insulator layer 122 is disposed between the support layer 116 and a corresponding portion of the flex cable 101', with the electrical insulator layer 122 interfacing with both the support layer 116 and the flex cable 101'. A cover layer 126 may be included on one or more portions of the flex cable 101', but is removed from at least some of the drawings to enhance the illustration of various other relevant features of the flexure 115' (e.g., the cover layer 126 is not in any of FIGS. 8A-C, but is shown in FIGS. 8D and 8E).

The support layer 116 exists for the entire flexure 115', including the flexure tongue 128', the bond pad platform 130', and the gimbal legs 132'. Although the electrical insulator layer 122 could be disposed over the entirety of the support layer 166, it is only required for those locations where the support layer 116 needs to be electrically isolated from the flex cable 101'. FIG. 7 shows only a portion of the suspension 108 so as to enhance the view of the flexure 115'. The support layer 116 is appropriately mounted to the suspension 108 and is the primary provider of structural support for the slider assembly 136. One characterization in this regard is that the support layer 116 provides more structural support for the slider assembly 136 than does the electrical insulator layer 122. As such, the support layer 116 will typically be more rigid than the electrical insulator layer 122, at least in a dimension corresponding with the flexing of the suspension 108 away from its corresponding data storage disk. That is, the support layer 116 will provide more resistance to a flexing in a dimension that is normal to the corresponding data storage disk than the electrical insulator layer 122. Appropriate materials for the support layer 116 include appropriate metals (e.g., stainless steel).

The electrical insulator layer 122 is appropriately fixed to corresponding portions of both the support layer 116 and flex cable 101' (e.g., the electrical insulator layer 122 is interposed between the support layer 116 and the flex cable 101'). Generally, the electrical insulator layer 122 electrically isolates the support layer 116 from relevant portions of the flex cable 101'. The electrical insulator layer 122 may be formed from any appropriate electrically insulating material (e.g., polyimide).

Each microactuator bond pad 103' and each slider bond pad 106' of the flex cable 101' is partially supported by a bond pad support 119 of the support layer 116 in the case of the flexure 115'. That is, something less than the entirety of each microactuator bond pad 103' is structurally supported by its corresponding bond pad support 119 of the support layer 116 (see FIG. 8E), and something less than the entirety of each slider bond pad 106' is supported by its corresponding bond pad support 119 of the support layer 116 (see FIG. 8D). Stated another way, projecting each bond pad support 119 of the support layer 116 onto its corresponding microactuator bond pad 103' would occupy something less than the entire surface area of this microactuator bond pad 103', while projecting each bond pad support 119 of the support layer 116 onto a corresponding slider bond pad 106' would also occupy something less than the entire surface area of this slider bond pad 106'. One advantage of the partial support of the bond pads 103', 106' by the bond pad supports 119 is that the flexure 115' accommodates both solder ball bonding and gold ball bonding.

Each bond pad support 119 of the support layer 116 may be at least generally characterized as a fixed beam (a structure that is fixed at its two opposing ends, and un-supported therebetween), and is defined by a pair of support layer bond pad apertures 117 that extend completely through the support layer 116. That is, the support layer 116 includes a plurality of support layer bond pad apertures 117, and the portion of the support layer 116 that remains between each adjacent pair of support layer bond pad apertures 117 defines a bond pad support 119. Each bond pad support 119 is vertically aligned with a portion (less than the entirety of) an overlying bond pad 103', 106', and preferably is centrally disposed. In any case, each edge of each bond pad support 119 is appropriately spaced in from each corresponding edge of the overlying bond pad 103', 106'.

Preferably, no portion of any of the bond pad supports 119 actually contacts any corresponding bond pad 103', 106'. Instead, a portion of the electrical insulator layer 122 is retained therebetween. In this regard and for the case of the illustrated embodiment, a plurality of insulator bond pad apertures 123 extend completely through the electrical insulator layer 122 to define a plurality of electrical insulator sections 125. That is, the electrical insulator layer 122 includes a plurality of electrical insulator layer bond pad apertures 123, and the portion of the electrical insulator layer 122 that remains between each adjacent pair of electrical insulator layer bond pad apertures 123 defines an electrical insulator section 125. Each electrical insulator section 125 engages only a portion of (less than the entirety of) an overlying bond pad 103', 106', and preferably is centrally disposed. In any case, each edge of each electrical insulator section 125 is appropriately spaced in from each corresponding edge of the overlying bond pad 103', 106'. As such, each electrical insulator section 125 provides a desired separation between each bond pad 103', 106' and its corresponding bond pad support 119 of the support layer 116.

There are a number of characterizations that pertain to those support layer bond pad apertures 117 that are associated with all slider bond pads 106' and certain microactuator bond pads 103'. One is that there is a one-to-one relation between these support layer bond pad apertures 117 and the insulator bond pad apertures 123—that is each of these support layer bond pad apertures 117 is associated with its own insulator bond pad aperture 123. Another is that the center of these support layer bond pad apertures 117 and the center of their corresponding insulator bond pad aperture 123 are at least generally vertically aligned (e.g., FIGS. 7, 8A). Another is that these support layer bond pad aperture 117 and their corresponding insulator bond pad aperture 123 are at least generally concentrically disposed (e.g., FIGS. 7, 8A).

There are additional characterizations that pertain to all support layer bond pad apertures 117. One is that each such support layer bond pad aperture 117 is larger than its corresponding insulator bond pad aperture(s) 123. Note that for two of the support layer bond pad apertures 117 associated with the microactuator bond pads 103', each such support layer bond pad aperture 117 is actually associated with two insulator bond pad apertures 123 (FIGS. 7 and 8E). Yet another is that a perimeter of each support layer bond pad aperture 117 is disposed further beyond a perimeter of its corresponding insulator bond pad aperture(s) 123. That is, the entire edge of each support layer bond pad aperture 117 is offset from the entire edge of its corresponding insulator bond pad aperture(s) 123.

Each microactuator bond pad 103' and each slider bond pad 106' is disposed over part of each insulator bond pad aperture 123 of an adjacent pair of insulator bond pad apertures 123, and is also disposed over part of each support layer bond pad aperture 117 of an adjacent pair of support layer bond pad apertures 117. In the illustrated embodiment and at least for the case of the slider bond pads 106', one slider bond pad 106' may extend over one part of a particular insulator bond pad aperture 123 and over one part of a particular support layer bond pad aperture 117, while another slider bond pad 106' may extend over a different part of this same insulator bond pad aperture 123 and over a different part of this same support layer bond pad aperture 117. FIGS. 8A and 8C show one part of one bond pad 106a' being disposed over one part of one insulator bond pad aperture 123 and another bond pad 106b' being disposed over a different part of the same insulator bond pad aperture 123.

Supporting the bond pads 103', 106' facilitates the interconnection of the same with the slider assembly 136 by ball bonding—whether via solder ball bonding, gold ball bonding, or a combination thereof. It also at least potentially alleviates the need for adhesive when mounting the slider assembly 136 to the flexure 115'. That is, the various slider bonds 184 and the various microactuator bonds 186 may provide the entire fixed connection between the slider assembly 136 and the flexure 115'. The flex cable 101' could include one or more bond pads at various other locations to facilitate an enhanced structural interconnection as well, even though no electrical interconnection may be required at a particular location. For instance, one or more bond pads could exist along the leading edge of the microactuator 156 (the edge thereof that is opposite the trailing edge 148 of the slider 140) to enhance the structural interconnection between the flexure 115' and the slider assembly 136.

It should also be appreciated that the bond pad supports 119 described herein may be used with various flexure configurations. For instance, the slider assembly 136 could be entirely disposed on a flexure tongue that is adapted to include the noted arrangement of support layer bond pad apertures 117 and insulator bond pad apertures 123. It should also be appreciated that bond pad supports 119 could be provided only for the microactuator bond pads 103', only for the slider bond pads 106', for one or more microactuator bond pads 103' and/or one or more slider bond pads 106', or for all microactuator bond pads 103' and all slider bond pads 106' as shown for the illustrated embodiment.

One representative fabrication technique for the flexure 115' will be described. Material that will define the electrical insulator layer 122 may be deposited on a material that will define the support layer 116. The material for the electrical insulator layer 122 may be masked and etched to define the electrical insulator layer 122 of the flexure 115' (including its insulator bond pad apertures 123). A seed layer for the relevant bond pad (103', 106') is then deposited onto the electrical insulator layer 122, including into the insulator bond pad apertures 123. This seed layer is then masked and etched such that an additional material (e.g., copper) may be electroplated to define the various bond pads 103', 106. Note that part of the various bond pads 103', 106' (specifically, inset sections 104', 107', respectively) will occupy a portion of each of its two corresponding insulator bond pad apertures 123. FIG. 8B illustrates the resulting "step-down" feature that defines the two inset sections 104' of each bond pad 103' and the two inset sections 107' of each bond pad 106'. The material for the support layer 116 is then masked and etched (a back-side etch) to define the support layer bond pad apertures 117. Note that the perimeter of the support layer bond pad apertures 117 will be spaced from the inset sections 104', 107' of the bond pads 103', 106', respectively, such that there is no short. That is, even though part of each bond pad 103', 106' may extend within the insulator bond pad apertures 123, having the support layer bond pad apertures 117 being larger provides a sufficient space from the inset sections 104', 107'.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described herein-above are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive flexure assembly, comprising
   a support layer, wherein said support layer comprises a plurality of support layer bond pad apertures disposed in spaced relation;
   an electrical insulator layer;
   an electrical layer, wherein said electrical insulator layer is disposed between said support layer and said electrical layer; and
   a first bond pad associated with said electrical layer, wherein said first bond pad is disposed over at least part of each member of a pair of said support layer bond pad apertures such that said first bond pad is partially supported by said support layer.

2. The disk drive flexure assembly of claim 1, wherein said support layer is more rigid than said electrical insulator layer.

3. The disk drive flexure assembly of claim 1, wherein said support layer comprises a fixed beam that is located between and defined by said pair of said support layer bond pad apertures, and wherein said fixed beam is aligned with part of said first bond pad.

4. The disk drive flexure assembly of claim 3, wherein said fixed beam is aligned with a central portion of said first bond pad.

5. The disk drive flexure assembly of claim 1, wherein said first bond pad is electrically interconnectable with a slider positioner connection pad of a slider positioner.

6. The disk drive flexure assembly of claim 1, wherein said first bond pad is electrically interconnectable with a slider connection pad of a slider.

7. A head-gimbal assembly comprising a slider assembly, the disk drive flexure assembly of claim 1, and solder, wherein said slider assembly comprises a slider assembly connection pad, and wherein said solder is fixed to each of said first bond pad and said slider assembly connection pad.

8. A head-gimbal assembly comprising a slider assembly, the disk drive flexure assembly of claim 1, and gold, wherein said slider assembly comprises a slider assembly connection pad, and wherein said gold is fixed to each of said first bond pad and said slider assembly connection pad.

9. The disk drive flexure assembly of claim 1, wherein said electrical insulator layer comprises a plurality of electrical insulator layer bond pad apertures.

10. The disk drive flexure assembly of claim 9, wherein each said support layer bond pad aperture is larger than any corresponding said electrical insulator layer bond pad aperture.

11. The disk drive flexure assembly of claim 9, wherein a perimeter of each said support layer bond pad aperture is disposed beyond a perimeter of any corresponding said electrical insulator layer bond pad aperture.

12. A head-gimbal assembly comprising the disk drive flexure assembly of claim 1 and a slider, wherein said slider is mounted on said disk drive flexure assembly without any adhesive.

13. A head-gimbal assembly comprising the disk drive flexure assembly of claim 1, a slider, and a slider positioner, wherein said slider is mounted to said slider positioner, and wherein said slider positioner is mounted to said disk drive flexure assembly without any adhesive.

14. A head-gimbal assembly comprising the disk drive flexure assembly of claim 1, a slider, and a slider positioner, wherein said slider is mounted to said slider positioner, wherein said slider comprises a plurality of slider connection pads, wherein said slider positioner comprises a plurality of slider positioner pads, wherein said disk drive flexure assembly comprises a plurality of said first bond pads, and wherein a separate said first bond pad is electrically interconnected with each said slider connection pad and each said slider positioner pad.

15. The head-gimbal assembly of claim 14, further comprising a bond between each said first bond pad and its corresponding said slider connection pad and between each said first bond pad and its corresponding said slider positioner pad.

16. The head-gimbal assembly of claim 15, wherein said bond between each said first bond pad and its corresponding said slider connection pad provides an entirety of a fixed mounting of said slider to said to flexure assembly, and wherein said bond between each said first bond pad and its corresponding said slider positioner pad provides an entirety of a fixed mounting of said slider positioner to said disk drive flexure assembly.

17. The head-gimbal assembly of claim 15, wherein a fixed connection of said slider positioner to said disk drive flexure assembly is free of any adhesive, and wherein a fixed connection of said slider to said disk drive flexure assembly is also free of any adhesive.

18. A disk drive flexure assembly, comprising
   a support comprising a plurality of support bond pad apertures and a bond pad support, wherein said bond pad support is located between and defined by an adjacent pair of said support bond pad apertures, and wherein said support and said bond pad support are both metal; and
   an electrical trace assembly comprising a bond pad, wherein said bond pad is disposed over said bond pad support and part of each said support bond pad aperture of said adjacent pair.

19. The disk drive flexure assembly of claim 18, further comprising an electrical insulator, wherein said electrical insulator is disposed between said support and said electrical trace assembly.

20. The disk drive flexure assembly of claim 19, wherein said support is more rigid than said electrical insulator.

21. The disk drive flexure assembly of claim 19, wherein said electrical insulator comprises a plurality of electrical insulator bond pad apertures.

22. The disk drive flexure assembly of claim 21, wherein each said support bond pad aperture is larger than any corresponding said electrical insulator bond pad aperture.

23. The disk drive flexure assembly of claim 22, wherein a perimeter of each said support bond pad aperture is disposed beyond a perimeter of any corresponding said electrical insulator bond pad aperture.

24. The disk drive flexure assembly of claim 18, wherein said bond pad support is a fixed beam.

25. The disk drive flexure assembly of claim 24, wherein said bond pad support is aligned with a central portion of said bond pad.

26. The disk drive flexure assembly of claim 18, wherein said bond pad support is aligned with a central portion of said bond pad.

27. The disk drive flexure assembly of claim 18, wherein said bond pad is electrically interconnectable with a slider positioner connection pad of a slider positioner.

28. The disk drive flexure assembly of claim 18, wherein said bond pad is electrically interconnectable with a slider connection pad of a slider.

29. A head-gimbal assembly comprising a slider assembly, the disk drive flexure assembly of claim 18, and solder, wherein said slider assembly comprises a slider assembly connection pad, wherein said solder is fixed to each of said bond pad and said slider assembly connection pad.

30. A head-gimbal assembly comprising a slider assembly, the disk drive flexure assembly of claim 18, and gold, wherein said slider assembly comprises a slider assembly connection pad, wherein said gold is fixed to each of said bond pad and said slider assembly connection pad.

31. A head-gimbal assembly comprising the disk drive flexure assembly of claim 18 and a slider, wherein said slider is mounted on said disk drive flexure assembly without any adhesive.

32. A head-gimbal assembly comprising the disk drive flexure assembly of claim 18, a slider, and a slider positioner, wherein said slider is mounted to said slider positioner, and wherein said slider positioner is mounted to said disk drive flexure assembly without any adhesive.

33. A head-gimbal assembly comprising the disk drive flexure assembly of claim 18, a slider, and a slider positioner, wherein said slider is mounted to said slider positioner, wherein said slider comprises a plurality of slider connection pads, wherein said slider positioner comprises a plurality of slider positioner pads, wherein said disk drive flexure assembly comprises a plurality of said bond pads, and wherein a separate said bond pad is electrically interconnected with each said slider connection pad and each said slider positioner pad.

34. The head-gimbal assembly of claim 33, further comprising a bond between each said bond pad and its corresponding said slider connection pad and between each said bond pad and its corresponding said slider positioner pad.

35. The head-gimbal assembly of claim 34, wherein said bond between each said bond pad and its corresponding said slider connection pad provides an entirety of a fixed mounting of said slider to said to disk drive flexure assembly, and wherein said bond between each said bond pad and its corresponding said slider positioner pad provides an entirety of a fixed mounting of said slider positioner to said flexure assembly.

36. The head-gimbal assembly of claim 34, wherein a fixed connection of said slider positioner to said disk drive flexure assembly is free of any adhesive, and wherein a fixed connection of said slider to said disk drive flexure assembly is free of any adhesive.

* * * * *